(12) United States Patent
John et al.

(10) Patent No.: US 6,522,511 B1
(45) Date of Patent: Feb. 18, 2003

(54) HIGH SPEED ELECTROSTATIC DISCHARGE PROTECTION CIRCUIT

(75) Inventors: Willis John, Austin, TX (US); May Mike, Austin, TX (US); Takeda Fujio, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 7 days.

(21) Appl. No.: 09/595,300

(22) Filed: Jun. 15, 2000

(51) Int. Cl.$^7$ ................................................ H02H 3/22
(52) U.S. Cl. .......................................... 361/56; 361/111
(58) Field of Search ............................. 361/56, 111, 54; 327/309, 310, 365, 419, 427; 257/355, 356

(56) References Cited

U.S. PATENT DOCUMENTS

| 5,287,241 A | | 2/1994 | Puar | |
| 5,311,391 A | * | 5/1994 | Dungan et al | 361/56 |
| 5,559,659 A | | 9/1996 | Strauss | |
| 5,617,283 A | * | 4/1997 | Krakauer et al. | 361/56 |
| 5,745,323 A | | 4/1998 | English et al. | |
| 5,870,268 A | * | 2/1999 | Lin et al. | 361/111 |
| 5,917,689 A | * | 6/1999 | English et al. | 361/56 |
| 5,946,177 A | | 8/1999 | Miller et al. | |
| 6,046,897 A | * | 4/2000 | Smith et al. | 361/111 |
| 6,069,782 A | * | 5/2000 | Lien et al. | 361/111 |
| 6,075,686 A | * | 6/2000 | Ker | 361/56 |

OTHER PUBLICATIONS

John Willis, Design on the Low–Leakage Diode String for Using in the Power–Rail ESD Clamp Circuits in a 0.35–$\mu$m Silicide CMOS Process.

* cited by examiner

*Primary Examiner*—Kim Huynh
(74) *Attorney, Agent, or Firm*—Timothy W. Markison

(57) ABSTRACT

An electrostatic discharge (ESD) protection circuit for use in an integrated circuit includes a transistor, an inverter, and an ESD detector. The transistor is coupled to clamp a non-power supply pad of the integrated circuit to a power supply pad of the integrated circuit when an ESD event is detected. The ESD detector is operably coupled to detect an ESD event on the non-power supply pad and to provide an indication of the ESD event to the inverter. The inverter provides an amplified signal to the gate of the transistor such that the transistor is driven quickly into low impedance conduction.

20 Claims, 4 Drawing Sheets

HIGH SPEED ELECTROSTATIC DISCHARGE PROTECTION CIRCUIT

TECHNICAL FIELD OF THE INVENTION

This invention relates generally to integrated circuits and more particularly to electrostatic discharge (ESD) protection circuits.

BACKGROUND OF THE INVENTION

Electrostatic discharge (ESD) is known to damage electronic circuitry, especially integrated circuits (IC). As is known, ICs that are fabricated using smaller processing techniques (e.g. 0.25 micron technology) are more susceptible to being damaged by ESD than ICs that are fabricated using a larger processing technique (0.5 micron technology). To minimize damage due to ESD, ICs are manufactured, shipped, and handled in special ways. For example, ICs are typically shipped in tubes that protect against ESD. In addition, persons handling the integrated circuits wear ESD wrist straps to protect against ESD.

While manufacturing, shipping, and handling ESD protection techniques reduce the risk of ESD damage to ICs, the risk is not eliminated. To further reduce the risk of ESD damage, many integrated circuits include ESD protection circuits. Such ESD protection circuits include an ESD sensing circuit and a clamp. The clamp is typically a transistor that is coupled between $V_{DD}$ (the positive supply voltage pin) and $V_{SS}$ (the negative supply voltage pin). The clamping transistor is triggered by one of a variety of ESD sensing circuits.

One simple ESD sensing circuit incorporates a resistor-capacitor (RC) circuit, which, based on the time constant of the RC circuit, will detect an ESD event. A difficulty arises with such an ESD sensing circuit when used with high-speed digital circuitry. For example, if the RC time constant is set to high (e.g. to avoid false triggering due to the high speed digital switching), an ESD event may not be recognized until damage has occurred. If, on the other hand, the RC time constant is set too low (e.g. to ensure proper detection of an ESD event) false triggering may result when used in a high-speed digital switching circuits.

To overcome the false triggering problem, some ESD sensing circuits implement a smaller resistor-capacitor (RC) time constant, which delays the activation of the clamping transistor such that false triggering is minimized. While this protects against false triggering, it slows the responsiveness of the ESD protection circuit and requires additional circuitry.

Therefore, a need exists for an ESD protection circuit that is not susceptible to false triggering in high-speed digital circuits, is very responsive to ESD events, and does not require additional false triggering compensation circuitry.

DETAILED DESCRIPTION OF A PREFERRED EMBODIMENT

Generally, the present invention provides an electrostatic discharge (ESD) protection circuit for use in an integrated circuit. The ESD protection circuit includes a transistor, an inverter, and an ESD detector. The transistor is coupled to clamp a non-external power supply pad of the integrated circuit to a power supply pad of the integrated circuit when an ESD event is detected. The ESD detector is operably coupled to detect an ESD event on the non-power supply pad and to provide an indication of the ESD event to the inverter. The inverter provides an amplified signal to the gate of the transistor such that the transistor is driven quickly into low impedance conduction. The ESD detector does not include capacitors for sensing of the ESD event thus is not susceptible to false triggering when used in high-speed digital circuitry. The present ESD protection circuit is therefore well suited to protect analog circuitry, to protect high-speed digital circuits, is very responsive to ESD events and does not require additional false triggering compensation circuitry.

Figure 1:
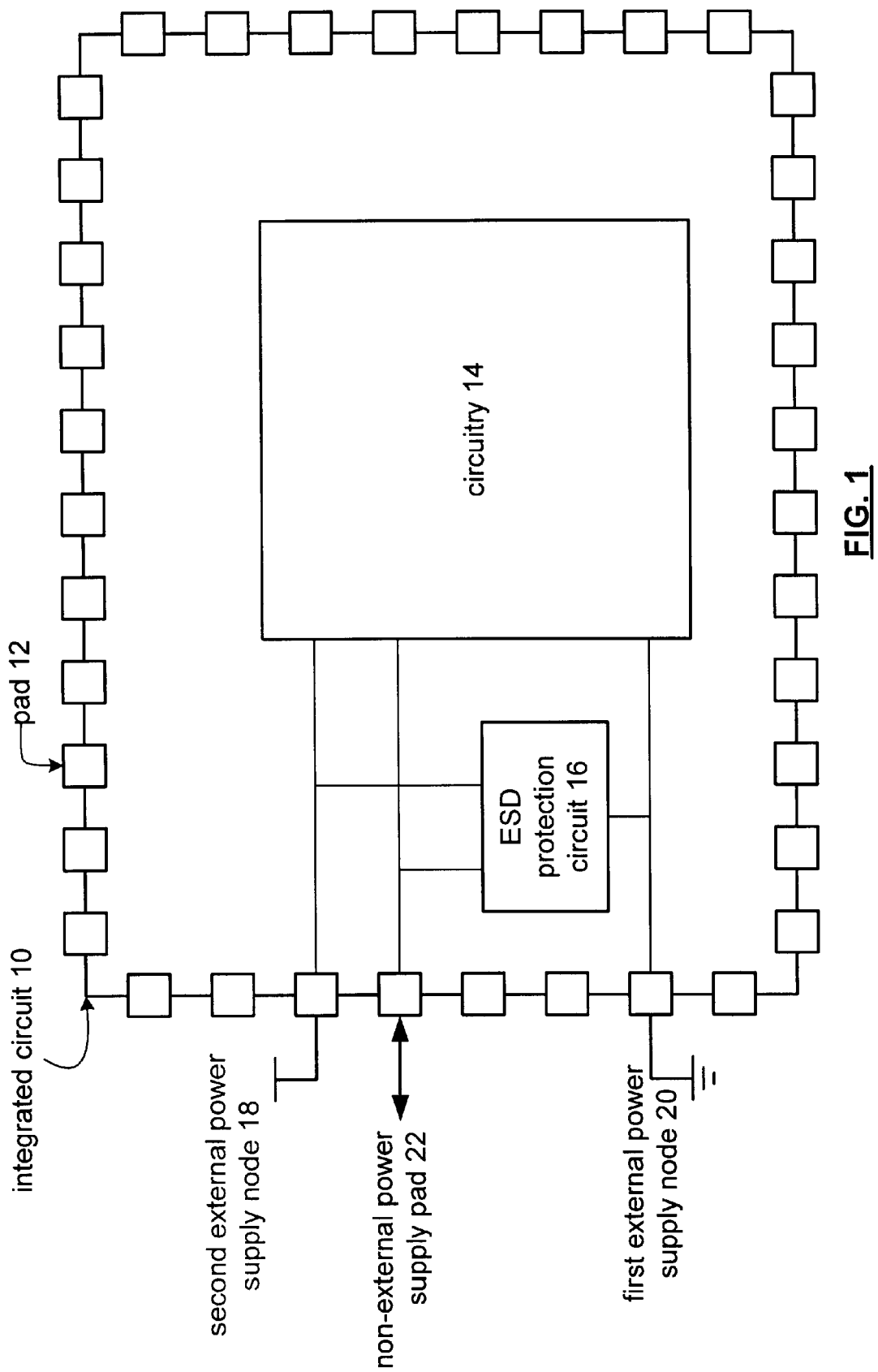
FIG. 1 illustrates a schematic block diagram of an integrated circuit including an ESD protection circuit in accordance with the present invention.

The present invention can be more fully described with reference to FIGS. 1 through 4. FIG. 1 illustrates a diagram of an integrated circuit 10 that includes a plurality of pads 12, circuitry 14, and an ESD protection circuit 16. As shown, the circuitry 14 is coupled to a 2nd external power supply node 18 via a $V_{DD}$ pad, to a 1st external power supply node 20 via a $V_{SS}$ pad, and to a non-external power supply pad 22. The non-external power supply pad 22 may be an input pad, output pad, current signal pad, internally generated voltage reference pad, internally generated supply voltage, etc. The circuitry 14 may be any circuitry found in an integrated circuit including, but not limited to, a digital signal processor, logic circuitry, state machine, analog circuitry, analog to digital converter, a mixer, audio control circuitry, and digital to analog converter.

The ESD protection circuit 16 is operably coupled to the 2nd external power supply node 18, the $1^{st}$ external power supply node 20, and the non-external power supply pad 22. As coupled, the ESD protection circuit 16 detects an ESD event on the non-external power supply pad 22 and clamps the pad 22 to either the $1^{st}$ or the $2^{nd}$ power supply nodes 20 and 18 when an ESD event occurs.

Figure 2:
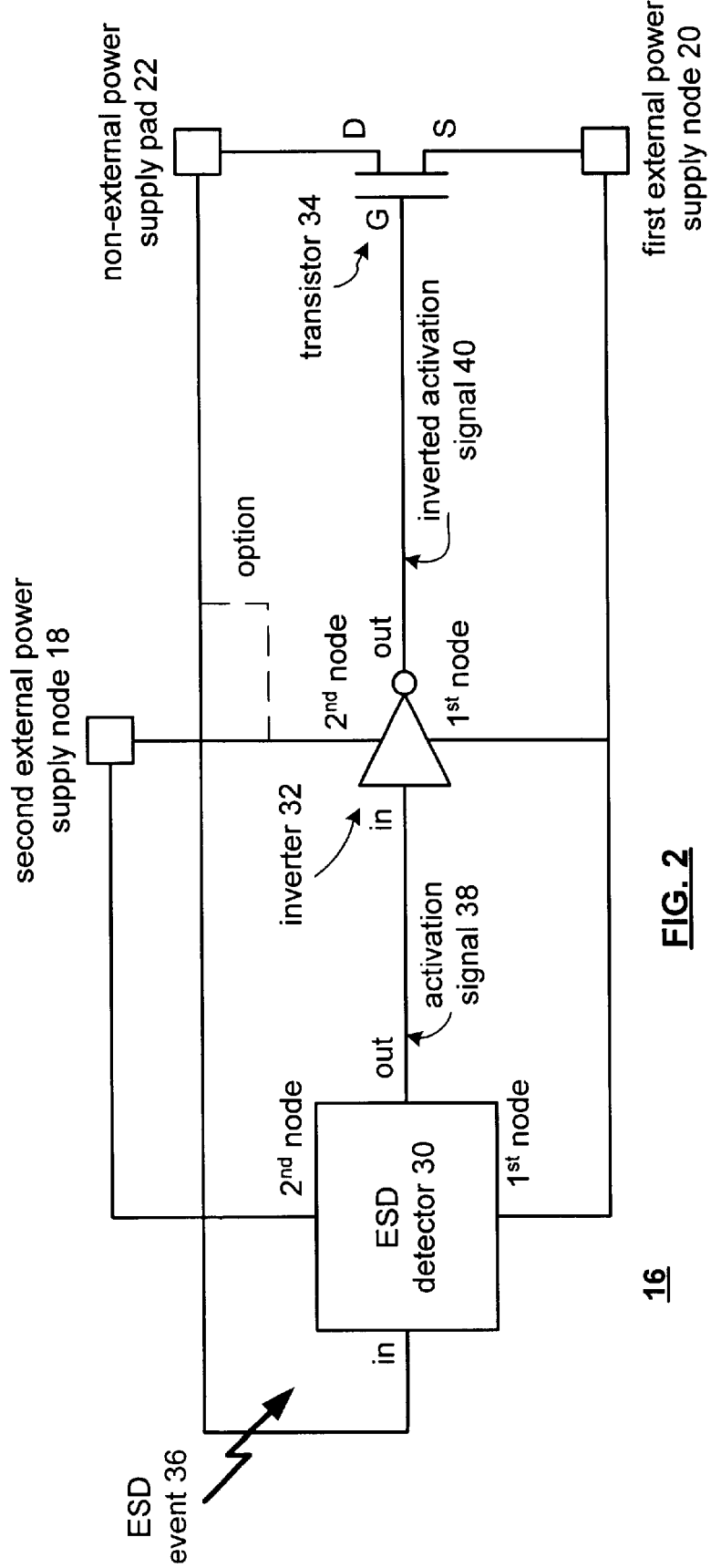
FIG. 2 illustrates a schematic block diagram of an ESD protection circuit in accordance with the present invention.

FIG. 2 illustrates a schematic block diagram of one embodiment of the ESD protection circuit 16. In this embodiment, the ESD protection circuit 16 includes an ESD detector 30, an inverter 32, and a transistor 34. The ESD detector 30 includes an input, an output, a $1^{st}$ power supply node, and a $2^{nd}$ power supply node. The input of the ESD detector 30 is operably coupled to the non-external power supply pad 22 and senses an ESD event 36. The $2^{nd}$ power supply node of the ESD detector 30 is operably coupled to the $2^{nd}$ external power supply node 18. The $1^{st}$ power supply node of ESD detection circuit 30 is operably coupled to the $1^{st}$ external power supply node 20. When the ESD detector 30 detects an ESD event on the pad 22, it produces an activation signal 38 at its output.

The inverter 32 receives the activation signal at its input and produces an inverted activation signal 40 at its output. The inverter 32 is powered via $1^{st}$ and $2^{nd}$ power supplies that are coupled to the $2^{nd}$ external power supply node 18 and the $1^{st}$ external power supply node 20, respectively. The inverted activation signal 40 provides a sufficient drive to the gate of transistor 34 such that the transistor 34 is quickly turned on. As transistor 34 is activated, it clamps the non-external power supply pad 22 to the 1st external power supply node 20. Note that the 1$^{st}$ external power supply node may be $V_{SS}$ or $V_{DD}$ and the 2$^{nd}$ external power supply node 18 will be the compliment of the 1$^{st}$ external power supply node 20. For example, if the 1$^{st}$ external power supply node is $V_{SS}$, then the 2$^{nd}$ external power supply node 18 will be $V_{DD}$. Note that the inverter 32 could be coupled to the non-external power supply node 22 instead of the 2$^{nd}$ external power supply node 18.

Figure 3:
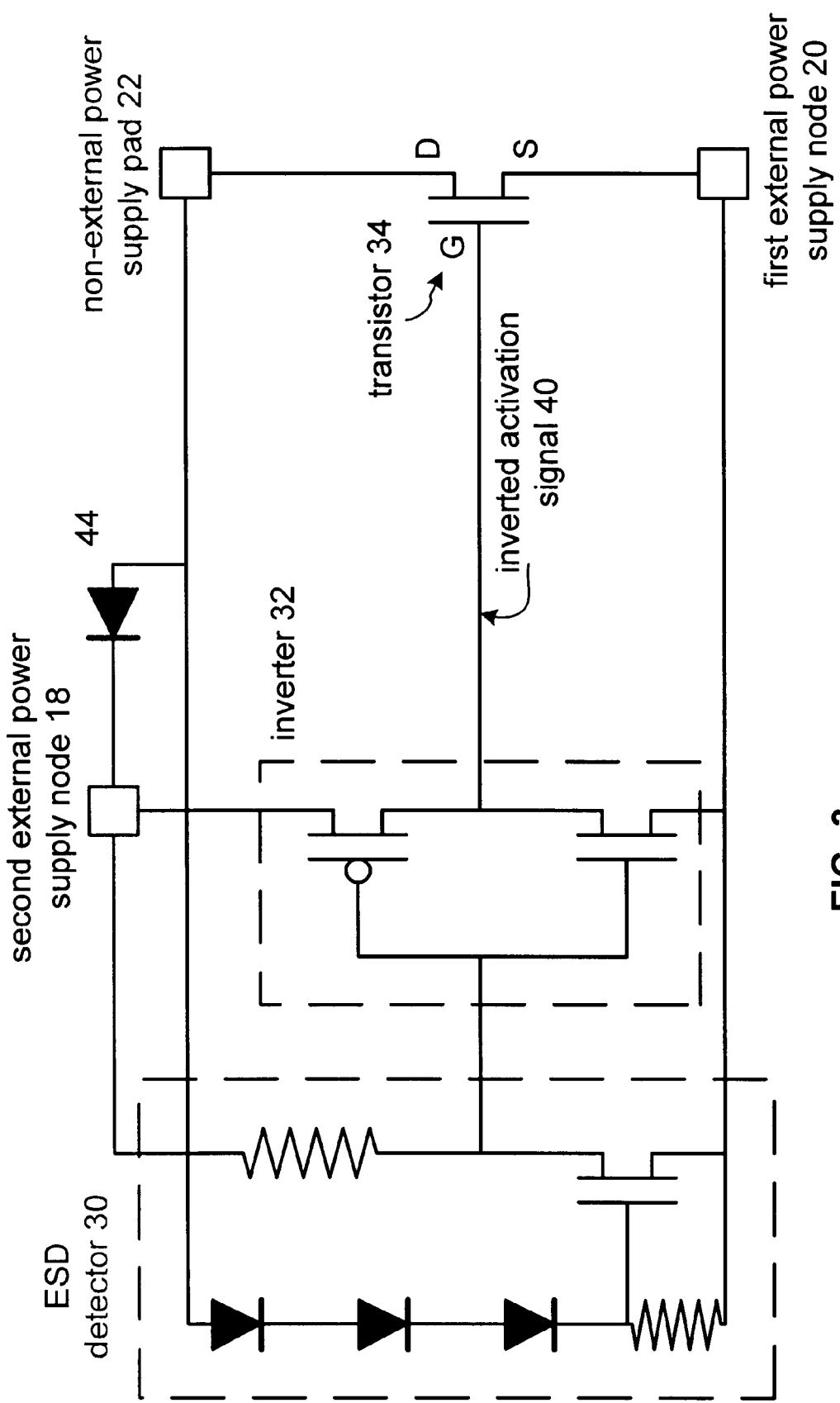
FIG. 3 illustrates a schematic block diagram of an alternate ESD protection circuit in accordance with the present invention.

FIG. 3 illustrates a schematic block diagram of an alternate ESD protection circuit 16. In this embodiment, the ESD protection circuit 16 includes the ESD detector 30, the inverter 32 and transistor 34. In addition, the ESD protection circuit includes diode 44 coupled between the non-external power supply pad 22 and the 2$^{nd}$ external power supply pad node 18. The ESD detector 30 includes a plurality of diodes, resistors and a transistor coupled as shown. When a positive ESD event occurs on pad 22, the diodes are conductive such that the transistor is enabled. Diode 44, during an ESD event, provides power to the 2$^{nd}$ external power node 18, which is used to drive the inverter 32 and the ESD detector 30.

When the ESD detector 30 transistor is on, the inverter 32 which includes a P-channel transistor and N-channel transistor, produces the inverted activation signal 40 as a logical 1. In this state, transistor 34 is turned on into a low impedance state thereby clamping pad 22 to the 1$^{st}$ external power supply node 20. Note that transistor 34 may be a P-channel transistor where as the inverted activation signal 40 is produced as a logic 0. Further note that the ESD protection circuit 16 does not include capacitors to sense an ESD event. Thus, no RC time constant is included which overcomes the false triggering for use in high-speed digital circuitry. In addition, the ESD protection circuit 16 clamps the pad to one of the power supply pads as opposed to clamping the power supply pads together as is done in prior art ESD protection circuits.

Figure 4:
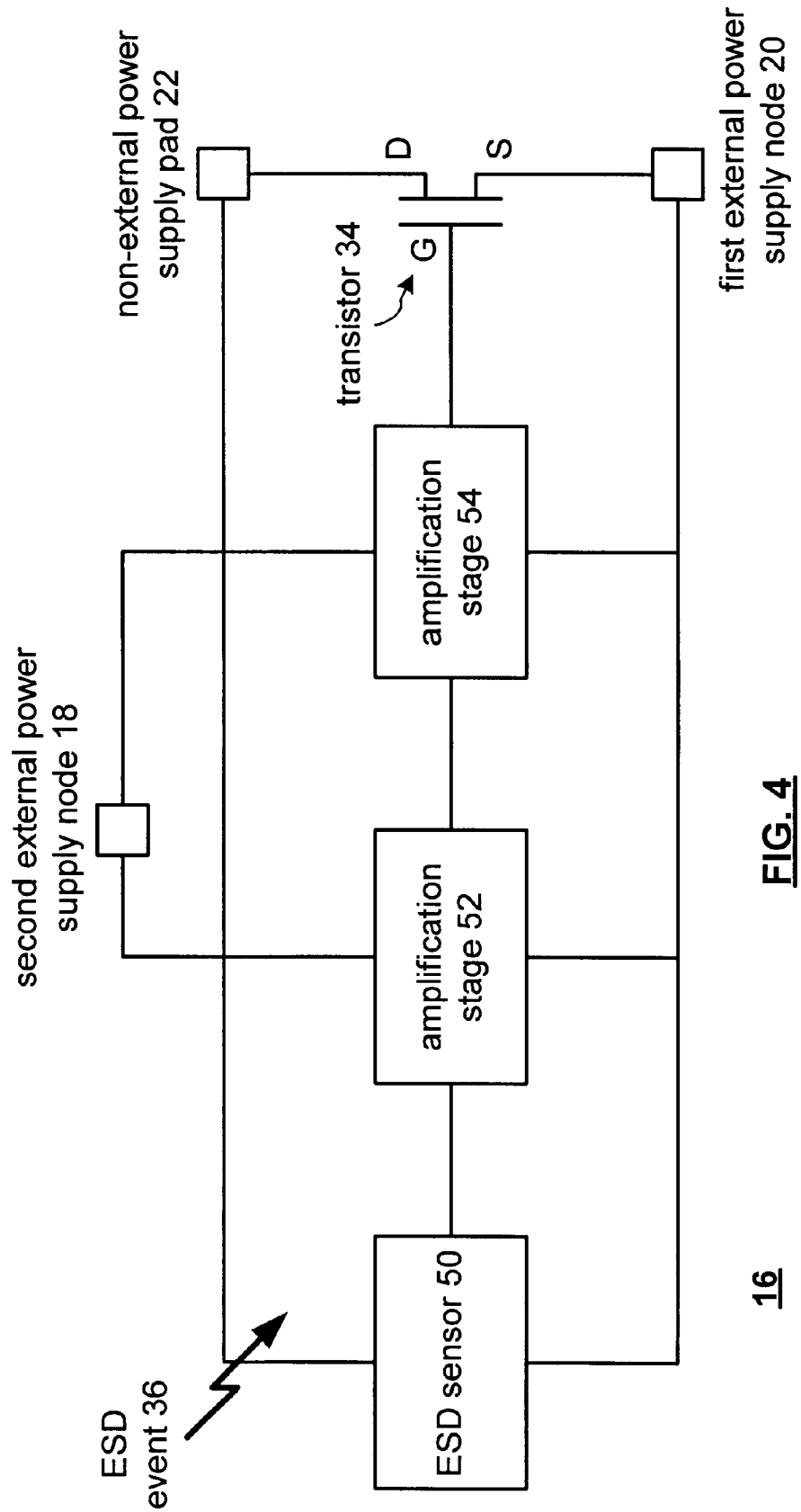
FIG. 4 illustrates a schematic block diagram of yet another alternate ESD protection circuit in accordance with the present invention.

FIG. 4 illustrates a schematic block diagram of another embodiment of the ESD protection circuit 16. In this embodiment, the ESD protection circuit includes an ESD sensor 50, a 1$^{st}$ amplification stage 52, a 2$^{nd}$ amplification stage 54, and transistor 34. The ESD circuit may also include a diode coupled between the pad 22 and the 2$^{nd}$ external power supply node 18. The ESD sensor 50 includes a series of diodes having an anode end, a cathode end, and a tap, where the anode end is operably coupled to the non-external power supply pad 22, the cathode end is operably coupled to the 1$^{st}$ external power supply pad and the tap is operably coupled to the input of the 1$^{st}$ amplification stage 52, detects an ESD event 36. The 1$^{st}$ amplification stage 52, which includes an N-channel transistor, is operably coupled to a resister wherein the gate of the N-channel transistor receives the output of the ESD sensor 50, the source of the N-channel transistor is coupled to the 1$^{st}$ external power supply node and the drain is coupled to the resister. The other end of the resister is coupled to the 2$^{nd}$ external power supply node 18. Thus, the first amplification stage 52 produces an amplified version of the output of the ESD sensor.

The 2$^{nd}$ amplification stage 54, which includes a P-channel transistor coupled to an N-channel transistor, receives the output of the 1$^{st}$ amplification stage and amplifies it to provide a drive current and/or voltage to transistor 34. The P-channel transistor of the amplification stage 54 has its gate coupled to the gate of the N-channel transistor, which receives the output from the 1$^{st}$ amplification stage 52. The source of the P-channel transistor is coupled to the 2$^{nd}$ external power supply node, or a 2$^{nd}$ source node, and the source of the N-channel transistor is coupled to the 1$^{st}$ external power supply node, or a 1$^{st}$ source node. The drains of the N-channel and P-channel transistors are coupled together to provide the output of the 2$^{nd}$ amplification stage 54. As one of average skill in the art will appreciate, the transistors in the ESD sensor 50, the first amplification stage 52, and the second amplification stage 54 may be progressively larger such that the transistors in amplification stage 54 provides a sufficient drive to transistor 34.

The preceding discussion has presented an ESD protection circuit that is well suited for use in high speed digital circuits as well as analog circuits, is very responsive to ESD events, and does not require additional false triggering compensation circuitry. As one of average skill in the art will appreciate, other embodiments may be derived from the teaching of the present invention without deviating from the scope of the claims. For example, N-channel transistors may be used in place of P-channel transistors, and vice versa, where the polarity of the signals is inverted to accommodate the change in transistors. In addition, bipolar transistors may be used in place of the FET transistors. Further, resisters and diodes may be implemented as properly biased transistors.

What is claimed is:

1. An electrostatic discharge (ESD) protection circuit for using in an integrated circuit, the ESD protection circuit comprises:

a transistor having a gate, drain, and source, wherein the drain is operably coupled to a non-external power supply pad of the integrated circuit, and wherein the source is coupled to a first external power supply pad of the integrated circuit;

an inverter having an inverter input, an inverter output, a first inverter supply node and a second inverter supply node, wherein the inverter output is operably coupled to the gate, wherein the first inverter supply node is operably coupled to the first external power supply pad;

an ESD detector having an ESD detector input, an ESD detector output, a first ESD detector supply node, and a second ESD detector supply node, wherein the ESD detector input is operably coupled to the non-external power supply pad, wherein the ESD detector output is operably coupled to the inverter input, wherein the first ESD detector supply node is operably coupled to the first external power supply pad and the second ESD detector supply node is operably coupled to a second external power supply pad, and wherein, when the ESD detector detects an ESD event, the ESD detector provides an activation signal to the inverter, the inverter inverts the activation signal and provides the inverted activation signal to the transistor, thereby enabling the transistor.

2. The ESD protection circuit of claim 1, wherein the inverter comprises:

a P-channel transistor having a P-gate, a P-source, and a P-drain, wherein the P-source is operably coupled as the first inverter supply node; and an N-channel transistor having an N-gate, an N-source, and an N-drain, wherein the N-source is operably coupled as the second inverter supply node, wherein the N-gate is operably coupled to the P-gate to form the inverter input, and wherein the N-drain is operably coupled to the P-drain to form the inverter output.

3. The ESD protection circuit of claim 1, wherein the ESD detector further comprises: an N-channel transistor having an N-gate, an N-source, and an N-drain, wherein the N-source is operably coupled to the first external power supply pad;

a resistor operably coupled to the second external power supply pad and the N-drain; and a series of diodes having an anode end and a cathode end, wherein the anode end is operably coupled as the ESD detector input, wherein the cathode end is operably coupled in series with a second resistor coupled to the first external power supply pad, and wherein the cathode end is operably coupled as the ESD detector output.

4. The ESD protection circuit of claim 1 further comprises a diode operably coupled between the non-external power supply pad and the second external power supply pad.

5. The ESD protection circuit of claim 1, wherein the inverter further comprises the second inverter supply node being operably coupled to one of: the second external power supply pad of the integrated circuit and the non-external power supply pad.

6. An electrostatic discharge (ESD) protection circuit for using in an integrated circuit, the ESD protection circuit comprises:

an ESD sensor operably coupled between a non-external power supply pad of the integrated circuit and a first external power supply pad of the integrated circuit;

a first amplification stage having a first input, a first output, a first source node and a first return node, wherein the first return node is operably coupled to the first external power supply pad and the first source node is operably coupled to a second external power supply pad of the integrated circuit, and wherein the first input is operably coupled to the ESD sensor;

a second amplification stage having a second input, a second output, a second source node and a second return node, wherein the second return node is operably coupled to the first external power supply pad, wherein the second source node is operably coupled to a second external power supply pad of the integrated circuit, and wherein second input is operably coupled to the first output; and a transistor having a gate, drain, and source, wherein the drain is operably coupled to the non-external power supply pad of the integrated circuit, wherein the source is coupled to the first external power supply pad and wherein the gate is operably coupled to the second output.

7. The ESD protection circuit of claim 6, wherein the second amplification stage comprises:

a P-channel transistor having a P-gate, a P-source, and a P-drain, wherein the P-source is operably coupled as the second source node; and an N-channel transistor having an N-gate, an N-source, and an N-drain, wherein the N-source is operably coupled as the second return node, wherein the N-gate is operably coupled to the P-gate to form the second input, and wherein the N-drain is operably coupled to the P-drain to form the second output.

8. The ESD protection circuit of claim 6, wherein the first amplification stage further comprises:

an N-channel transistor having an N-gate, an N-source, and an N-drain, wherein the N-source is operably coupled as the first return node and wherein the N-gate is coupled as the first input; and a resistor operably coupled to the second external power supply pad and the N-drain, wherein the coupling of the resistor to the second external power supply pad constitutes the first source node and wherein the coupling of the resistor to the N-drain constitutes the first output.

9. The ESD protection circuit of claim 6, wherein the ESD sensor further comprises:

a series of diodes having an anode end and a cathode end, wherein the anode end is operably coupled as the ESD detector input, wherein the cathode end is operably coupled in series with a resistor coupled to the first external power supply pad, and wherein the cathode end is operably coupled as the ESD detector output.

10. The ESD protection circuit of claim 6 further comprises a diode operably coupled between the non-external power supply pad and the second external power supply pad.

11. An integrated circuit comprising:

a plurality of pads;

circuitry operably coupled to the plurality of pads; and an electrostatic discharge (ESD) protection circuit that includes:

a transistor having a gate, drain, and source, wherein the drain is operably coupled to a non-external power supply pad of the integrated circuit, and wherein the source is coupled to a first external power supply pad of the integrated circuit;

an inverter having an inverter input, an inverter output, a first inverter supply node and a second inverter supply node, wherein the inverter output is operably coupled to the gate, wherein the first inverter supply node is operably coupled to the first external power supply pad;

an ESD detector having an ESD detector input, an ESD detector output, a first ESD detector supply node, and a second ESD detector supply node, wherein the ESD detector input is operably coupled to the non-external power supply pad, wherein the ESD detector output is operably coupled to the inverter input, wherein the first ESD detector supply node is operably coupled to the first external power supply pad and the second ESD detector supply node is operably coupled to a second external power supply pad, and wherein, when the ESD detector detects an ESD event, the ESD detector provides an activation signal to the inverter, the inverter inverts the activation signal and provides an inverted activation signal to transistor, thereby enabling the transistor.

12. The integrated circuit of claim 11, wherein the inverter comprises:

a P-channel transistor having a P-gate, a P-source, and a P-drain, wherein the P-source is operably coupled as the first inverter supply node; and an N-channel transistor having an N-gate, an N-source, and an N-drain, wherein the N-source is operably coupled as the second inverter supply node, wherein the N-gate is operably coupled to the P-gate to form the inverter input, and wherein the N-drain is operably coupled to the P-drain to form the inverter output.

13. The integrated circuit of claim 11, wherein the ESD detector further comprises:

an N-channel transistor having an N-gate, an N-source, and an N-drain, wherein the N-source is operably coupled to the first external power supply pad;

a resistor operably coupled to the second external power supply pad and the N-drain; and a series of diodes having an anode end and a cathode end, wherein the anode end is operably coupled as the ESD detector input, wherein the cathode end is operably coupled in series with a second resistor coupled to the first external power supply pad, and wherein the cathode end is operably coupled as the ESD detector output.

14. The integrated circuit of claim 11 further comprises a diode operably coupled between the non-external power supply pad and the second external power supply pad.

15. The integrated circuit of claim 11, wherein the inverter further comprises the second inverter supply node being operably coupled to one of: the second external power supply pad of the integrated circuit and the non-external power supply pad.

16. An integrated circuit comprising:

a plurality of pads;

circuitry operably coupled to the plurality of pads; and an electrostatic discharge (ESD) protection circuit that includes:
- an ESD sensor operably coupled between a non-external power supply pad of the integrated circuit and a first external power supply pad of the integrated circuit;
- a first amplification stage having a first input, a first output, a first source node and a first return node, wherein the first return node is operably coupled to the first external power supply pad and the first source node is operably coupled to a second external power supply pad of the integrated circuit, and wherein the first input is operably coupled to the ESD sensor;
- a second amplification stage having a second input, a second output, a second source node and a second return node, wherein the second return node is operably coupled to the first external power supply pad, wherein the second source node is operably coupled to a second external power supply pad of the integrated circuit, and wherein second input is operably coupled to the first output; and
- a transistor having a gate, drain, and source, wherein the drain is operably coupled to the non-external power supply pad of the integrated circuit, wherein the source is coupled to the first external power supply pad and wherein the gate is operably coupled to the second output.

17. The integrated circuit of claim 16, wherein the second amplification stage comprises:

a P-channel transistor having a P-gate, a P-source, and a P-drain, wherein the P-source is operably coupled as the second source node; and an N-channel transistor having an N-gate, an N-source, and an N-drain, wherein the N-source is operably coupled as the second return node, wherein the N-gate is operably coupled to the P-gate to form the second input, and wherein the N-drain is operably coupled to the P-drain to form the second output.

18. The integrated circuit of claim 16, wherein the first amplification stage further comprises:

an N-channel transistor having an N-gate, an N-source, and an N-drain, wherein the N-source is operably coupled as the first return node and wherein the N-gate is coupled as the first input; and a resistor operably coupled to the second external power supply pad and the N-drain, wherein the coupling of the resistor to the second external power supply pad constitutes the first source node and wherein the coupling of the resistor to the N-drain constitutes the first output.

19. The integrated circuit of claim 16, wherein the ESD sensor further comprises:

a series of diodes having an anode end and a cathode end, wherein the anode end is operably coupled as the ESD detector input, wherein the cathode end is operably coupled in series with a resistor coupled to the first external power supply pad, and wherein the cathode end is operably coupled as the ESD detector output.

20. The integrated circuit of claim 16 further comprises a diode operably coupled between the non-external power supply pad and the second external power supply pad.

* * * * *